United States Patent
Dusterhoff

(10) Patent No.: US 9,383,961 B2
(45) Date of Patent: Jul. 5, 2016

(54) METHOD, APPARATUS, COMPUTER AND MOBILE DEVICE FOR DISPLAY AND VEHICLE HAVING THE APPARATUS

(75) Inventor: Kurt Dusterhoff, Evesham (GB)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/122,936

(22) PCT Filed: Jul. 6, 2012

(86) PCT No.: PCT/JP2012/067877
§ 371 (c)(1),
(2), (4) Date: Nov. 27, 2013

(87) PCT Pub. No.: WO2013/008901
PCT Pub. Date: Jan. 17, 2013

(65) Prior Publication Data
US 2014/0078022 A1 Mar. 20, 2014

(30) Foreign Application Priority Data
Jul. 12, 2011 (GB) .................................. 1111911.2

(51) Int. Cl.
*G09G 5/14* (2006.01)
*G09G 5/39* (2006.01)
*G06F 3/14* (2006.01)

(52) U.S. Cl.
CPC ............ *G06F 3/1454* (2013.01); *G06F 3/1423* (2013.01); *G09G 5/14* (2013.01); *G09G 5/39* (2013.01); *G09G 2380/10* (2013.01)

(58) Field of Classification Search
CPC ........ G06F 3/1423; G06F 3/1454; G09G 5/14
See application file for complete search history.

(56) References Cited

U.S. PATENT DOCUMENTS

| 6,415,224 B1 * | 7/2002 | Wako | G01C 21/3611 340/903 |
| 7,843,427 B2 * | 11/2010 | Ording | G06F 3/04812 345/157 |
| 8,078,359 B2 * | 12/2011 | Small | B60K 35/00 701/1 |

(Continued)

FOREIGN PATENT DOCUMENTS

| JP | 2008-244555 A | 10/2008 |
| JP | 2009-094775 A | 4/2009 |

(Continued)

OTHER PUBLICATIONS

International Search Report of the International Searching Authority mailed Aug. 21, 2012 for the corresponding international application no. PCT/JP2012/067877.

(Continued)

*Primary Examiner* — Patrick F Marinelli
(74) *Attorney, Agent, or Firm* — Posz Law Group, PLC

(57) ABSTRACT

There can be provided a display duplication apparatus for a vehicle. The apparatus can comprise an input connected to receive a display signal from a portable device and a first display configured to display an invitation for input to define a selected interface region from a display output of the portable device. The first display is further configured to display an invitation for to input define a target display location of the vehicle and the apparatus can further comprise a plurality of displays configured to display a selected interface region at a defined target display location of the vehicle.

34 Claims, 11 Drawing Sheets

(56) References Cited

U.S. PATENT DOCUMENTS

| | | | | |
|---|---|---|---|---|
| 8,594,467 | B2* | 11/2013 | Lu | G06F 3/017 382/302 |
| 8,677,284 | B2* | 3/2014 | Aguilar | G06F 3/04815 715/830 |
| 8,791,877 | B2* | 7/2014 | Kikuchi | G06F 3/0481 345/1.3 |
| 8,913,100 | B2* | 12/2014 | Tamkivi | G04W 4/027 345/2.3 |
| 2004/0201544 | A1* | 10/2004 | Love | G06F 3/1454 345/1.1 |
| 2006/0020903 | A1* | 1/2006 | Wang | G06F 3/0481 715/792 |
| 2006/0050018 | A1* | 3/2006 | Hutzel | B60K 35/00 345/60 |
| 2007/0055941 | A1 | 3/2007 | Bhakta et al. | |
| 2007/0143798 | A1 | 6/2007 | Jira et al. | |
| 2008/0122847 | A1 | 5/2008 | Takano et al. | |
| 2009/0249235 | A1* | 10/2009 | Kim | G06F 3/0481 715/765 |
| 2010/0060549 | A1 | 3/2010 | Tsern | |
| 2010/0138780 | A1* | 6/2010 | Marano | G06F 3/1415 715/804 |
| 2010/0220250 | A1* | 9/2010 | Vanderwall | G01C 11/02 348/837 |
| 2010/0299436 | A1* | 11/2010 | Khalid | G06F 1/1643 709/226 |
| 2010/0302130 | A1* | 12/2010 | Kikuchi | G06F 3/0481 345/1.3 |
| 2010/0313154 | A1* | 12/2010 | Choi | G06F 3/0219 715/765 |
| 2011/0037896 | A1* | 2/2011 | Lin | G06F 3/14 348/564 |
| 2011/0082615 | A1* | 4/2011 | Small | B60K 35/00 701/36 |
| 2011/0082616 | A1* | 4/2011 | Small | B60K 35/00 701/31.4 |
| 2011/0082627 | A1* | 4/2011 | Small | B60K 35/00 701/48 |
| 2011/0199389 | A1* | 8/2011 | Lu | G06F 3/017 345/619 |
| 2012/0060109 | A1* | 3/2012 | Han | G06F 3/1454 715/769 |
| 2012/0084663 | A1* | 4/2012 | Momchilov | G06F 3/0481 715/744 |
| 2012/0144347 | A1* | 6/2012 | Jo | G06F 3/04883 715/863 |
| 2012/0162277 | A1* | 6/2012 | Lin | G09G 5/003 345/690 |
| 2013/0176232 | A1* | 7/2013 | Waeller | B60K 35/00 345/173 |
| 2014/0078022 | A1* | 3/2014 | Dusterhoff | G06F 3/1423 345/3.1 |
| 2014/0132556 | A1* | 5/2014 | Huang | G06F 3/044 345/174 |
| 2014/0184473 | A1* | 7/2014 | Aoki | G06F 3/1415 345/1.3 |
| 2014/0184535 | A1* | 7/2014 | Helfman | G09G 5/14 345/173 |
| 2015/0160913 | A1* | 6/2015 | Lee | G06F 3/1454 345/2.2 |

FOREIGN PATENT DOCUMENTS

| | | |
|---|---|---|
| JP | 2010-130553 A | 6/2010 |
| WO | 2008/079891 A2 | 7/2008 |

OTHER PUBLICATIONS

Written Opinion of the International Searching Authority mailed Aug. 21, 2012 for the corresponding international application no. PCT/JP2012/067877.

GB Search Report in GB Application No. 1111911.2 dated Nov. 11, 2011.

Office Action dated Jun. 3, 2015 issued in corresponding Cn patent application No. 201280034490.6 (and English translation).

* cited by examiner

Select screen division templates

METHOD, APPARATUS, COMPUTER AND MOBILE DEVICE FOR DISPLAY AND VEHICLE HAVING THE APPARATUS

CROSS REFERENCE TO RELATED APPLICATIONS

This application is a U.S. national stage application of PCT/JP2012/067877 filed on Jul. 6, 2012, and claims priority to, and incorporates by reference, GB Patent Application No. 1111911.2 filed on Jul. 12, 2011.

TECHNICAL FIELD

The present disclosure relates generally to a method, an apparatus, a computer and a mobile device for display and a vehicle having the apparatus, and in particular but not exclusively to whole or partial duplication of a display from a portable device to a display of a vehicle.

BACKGROUND ART

Vehicles, including automobiles such as cars and vans may have one or more display screens which can be configured to display information. This can include, for example, information relating to a navigation device integrated into the vehicle or relating to so-called in-car entertainment.

SUMMARY

In view of the foregoing, it is an object of the present disclosure to provide a method, an apparatus, a computer and a mobile device related, not exclusively, to whole or partial duplication of a display from a portable device to a display of a vehicle. It is an object of the present disclosure to provide a vehicle having the apparatus.

Viewed from a first aspect, there can be provided a methods and apparatus that causes a region selected from a duplicated mobile device display to be displayed on a selected display of a vehicle. Thereby, a user can view information duplicated from the mobile device within the vehicle on a convenient display of the vehicle.

Viewed from another aspect, there can be provided a method of replicating a display element from a portable device onto a display of a vehicle, the method comprising: activating a region selection interface configured to receive an input defining a selected interface region from a display output of a mobile device; activating a target selection interface configured to receive an input defining a target display location within a vehicle; and outputting the selected interface region to the vehicle for display on the target display location.

Viewed from a further aspect, there can be provided a display duplication apparatus for a vehicle, the apparatus comprising: an input connected to receive a display signal from a portable device; and a first display configured to display an invitation for input to define a selected interface region from a display output of the portable device; wherein the first display is further configured to display an invitation for to input define a target display location of the vehicle; and a plurality of displays configured to display a selected interface region at a defined target display location of the vehicle.

Viewed from another aspect, there can be provided a vehicle comprising the display duplication apparatus.

Viewed from a further aspect, there can be provided a vehicle comprising: a device interface configured to provide a data connection to a mobile device received in the vehicle; a head unit configured to communicate with a received mobile device via the device interface and to establish a display duplication data stream from the mobile device to the head unit; a plurality of displays, each connected to receive a data input from the head unit for display on the display; and an input device connected to the head unit and configured to transmit an input received thereby to the head unit; wherein: the head unit is further configured to cause one of the displays to display a user interface section inviting input via the input device to define an interface region selected from a display output of a received mobile device; the head unit is further configured to cause one of the displays to display a user interface section inviting input via the input device to define a target display location on one of the plurality of displays; and the head unit is further configured to forward data relating to the selected interface region to the display that includes the target display location.

Viewed from anther aspect, there can be provided a computer for a vehicle, the computer comprising: a mobile device data connection input configured to communicate with a connected mobile device; a display output configured to output display buffer content; an input device connection configured to receive input signals; wherein the computer is configured to: receive a mobile device display data stream via the mobile device connection input; output via the display output data describing a user interface element to request display division input; receive a display division input via the input device connection; determine a display division based upon the received display division input; output via the display output data describing a user interface element to request target display input; receive a target display input via the input device connection; and output a portion of the mobile device data stream corresponding to a determined display division to a target display via the display output.

Viewed from a further aspect, there can be provided a mobile device comprising: a data output configured to carry a display duplication data stream; a memory configured to store application software; a display; and a processor configured to carry out application software and to output data via the display output and to output application software interface data via the display; wherein the application software comprises instructions to the processor to: output via the display an interface element to invite a display division input; output via the display an interface component to invite a target display input; and output via the data output a partial display duplication data stream corresponding to a division of the display to a connected vehicle for display on a target display of the vehicle.

Viewed from another aspect, there can be provided a computer program product configured to cause a programmable processing apparatus to carry out the method of replicating a display element from a portable device onto a vehicle display, or to become configured as the display duplication apparatus, or the computer, or the mobile device.

Viewed from another aspect, there can be provided a non-transitory computer readable medium comprising the computer program product.

Further features and combinations thereof provide by the present disclosure will become apparent from the following description.

BRIEF DESCRIPTION OF THE DRAWINGS

The above and other objects, features and advantages of the present disclosure will become more apparent from the following detailed description made with reference to the accompanying drawings. In the drawings.

DESCRIPTION OR EMBODIMENTS

Figure 1:
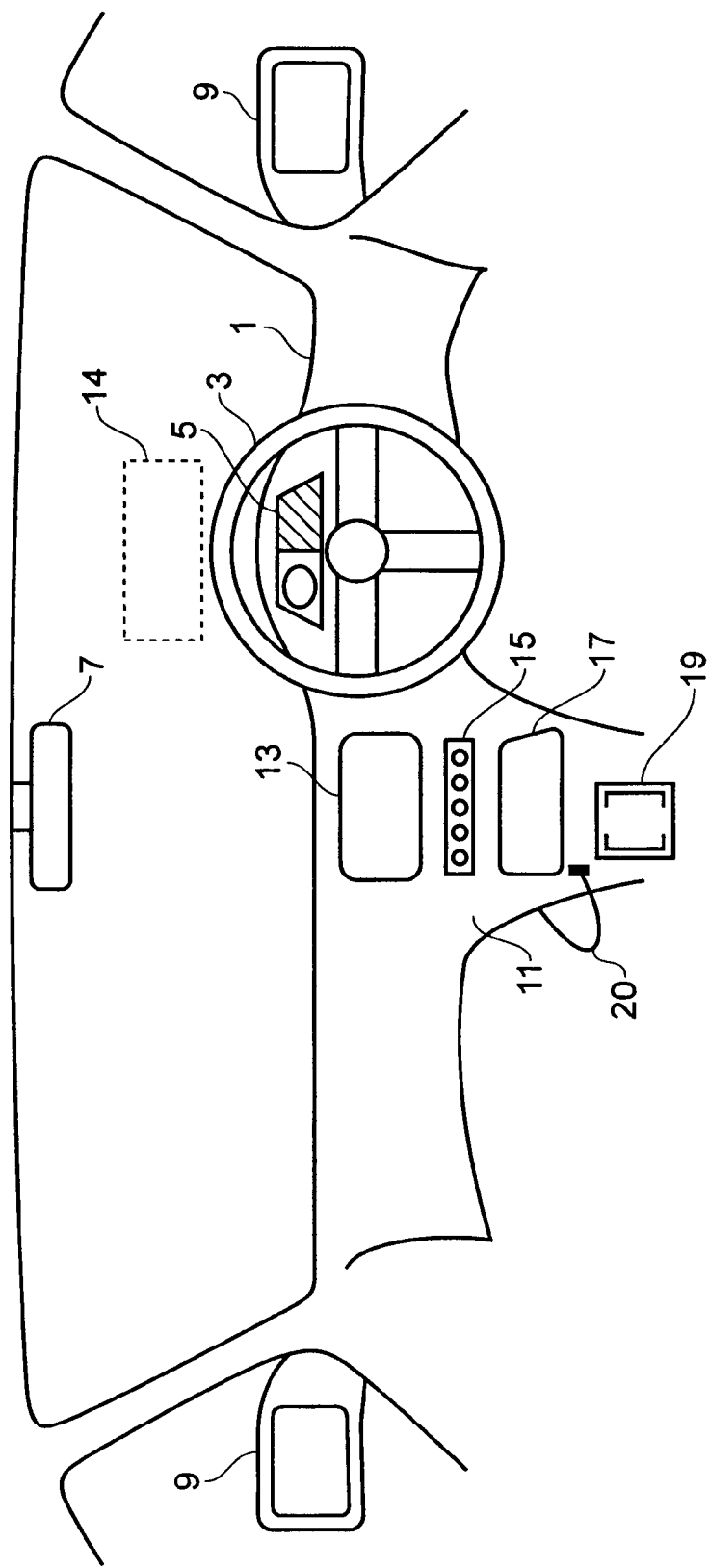
FIG. 1 shows a schematic representation of a vehicle interior.

While the disclosure is susceptible to various modifications and alternative forms, specific embodiments are shown by way of example in the drawings and are herein described in detail. It should be understood, however, that drawings and detailed description thereto are not intended to limit the disclosure to the particular form disclosed, but on the contrary, the disclosure is to cover all modifications, equivalents and alternatives falling within the spirit and scope of the present disclosure.

Within vehicles such as automobiles, one or more multiuse display screens may be provided within the vehicle interior. Examples of such screens may include a screen located in an area used to display core vehicle conditions (such as speed, fuel, temperature etc), a screen located in each of one or more mirrors, a screen located in a so-called centre console location, a head up display (HUD), and (in the case of a vehicle with more than one row of seats) a screen mounted into the rear of a front row seat for viewing by a rear seat passenger. Examples of vehicles into which such screens may be mounted can include cars, vans, trucks, pick-ups, lorries and motorcycles.

An example schematic view of a vehicle interior is shown in FIG. 1. In the Figure is shown a representation of a dashboard 1 and with respect to which a number of example screen locations are illustrated. As can be seen in the figure, located to be viewed through a steering wheel 3 is an instrument panel 5. This instrument panel may include some mechanical and/or dedicated electronic display elements in addition to one or more multi-purpose displays. Also shown is a rear-view mirror 7 and wing-mirrors 9, one or more of which may have a multi-purpose display embedded into all or a part thereof. In addition, there may be provided a multi-purpose screen 13 in a centre-console region 11 of the dashboard 1. Further, in some vehicles there may be provided a head-up display 14. Controls 15 may be provided to enable control of, for example, an in-car entertainment system. A storage compartment 17 and/or a device holder 19 may be provided into which a mobile device can be placed or by which a mobile device can be received. In addition, one or more cables 20 may be provided for arrangements in which a physical rather than wireless connectivity to/from a mobile device is used.

In the present context, a multi-purpose display is a display which can be configured to display more than one set of content at different times. Thus a multi-purpose display can be controlled to display different outputs under control of a vehicle display control system or a user and can display any suitable output. For example, a single screen region can be configured to display, at different times: speed information, navigation information and audio information. In some examples, such displays may be active matrix or passive matrix displays such liquid crystal displays (LCDs) utilizing technologies thin film transistor liquid (TFT), active matrix organic light emitting diode (AMOLED), Super-LCD and the like. Alternatively displays such as LED arrays or cathode ray tube (CRT) displays could be used.

In the following, teachings are provided in relation to providing a display on one or more multi-purpose displays within a vehicle of display information taken from one or more regions of a display of a mobile device received into the vehicle. In the present context, received refers to a data connection between the mobile device and the vehicle. Although it is likely that the mobile device would be in or mounted to the vehicle in some way, the actual physical location of the mobile device and the connection method to the vehicle (wired or wireless) is unimportant and the device could be placed in a storage compartment of the vehicle, mounted to a device holder in the vehicle, in a separate compartment of the vehicle (such as a boot or trunk), located within a garment or bag of a driver or passenger of the vehicle (which may in turn be inside the vehicle cabin or in a separate compartment such as a boot or trunk), or located in a storage compartment external to the vehicle (such as a roofbox). Thus, by utilizing the present teachings, it may be possible to view information from a mobile device display whilst driving a vehicle in such a way that using the mobile device in a specific device holder mounted in clear view of the driver is not necessary.

Figure 2:
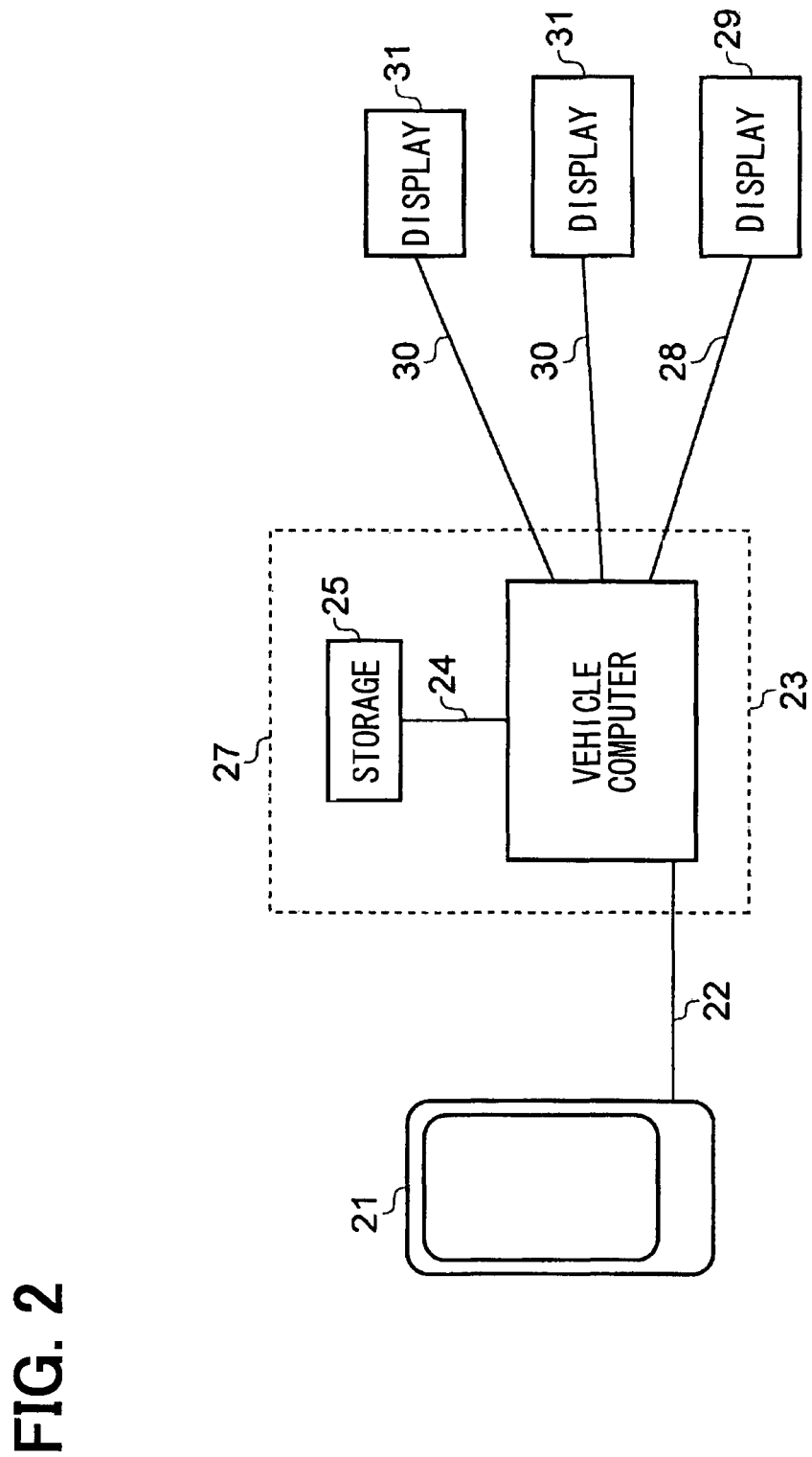
FIG. 2 shows a schematic representation of a mobile device received by a vehicle.

FIG. 2 illustrates a mobile device received by a vehicle. A mobile device 21 can include any form of portable computer equipment that has a display which a user may desire to replicate onto a vehicle display. Examples of mobile devices can include: mobile phones and smartphones (such as iPhones™, Android™ phones, Blackberry™ phones, Windows Mobile™ phones, Symbian™ phones and WebOS™ phones), personal digital assistants (such as iPod Touch™ devices, Palm™ handhelds and Windows Mobile™ handhelds), tablet computing devices (such as iPads™, Android™ tablets, WebOS™ tablets and Blackberry™ tablets), portable navigation devices, and portable computers (such as laptop computers using a Microsoft Windows™ or Linux™ operating system).

As shown, the mobile device 21 is connected via a data connection 22 to a vehicle computer 23. The data connection 22 can be a wired or wireless connection. A wired connection can utilise any suitable physical connector on the device, such as a mini/micro USB port or an Apple™ docking connector. A wireless connection can utilise any suitable wireless connectivity technology, such as Wi-Fi™ (IEEE 802.11 a/b/g/n/p) or Bluetooth™.

The vehicle computer 23 may have a data connection 24 to a mass data storage device 25 such as a hard disk, solid state storage or DVD drive. Such mass data storage may be used to store an operating system for the computer, data for a navigation application and/or audio-visual data. The vehicle computer 23 and data storage 25 may be referred to as a "head-unit" 27 (shown by dashed line in the figure). In other examples, the head-unit may include just the computer and the data storage may be a separate unit or module. The vehicle computer 23 may include a conventional processor, memory, data i/o and video output structure and may operate using an operating system such as Linux™, Windows Automotive™, Android™ or QNX™.

The vehicle computer 23 also has the capability to drive one or more displays. In the present example, a display drive connection 28 provides drive to a primary display 29 and display drive connections 30 provide drive to one or more secondary displays 31. In the present context, primary display is used to denote the display on which a primary user interface for the vehicle computer is displayed (which may be selectable under user control) and secondary display is used to denote any other display to which the vehicle computer can provide a display drive. In the context of the example vehicle interior of FIG. 1, the primary display might be the centre console display 13, with any displays in the instrument console 5, rear view mirror 7 or wing mirrors 9 treated as secondary displays. In other examples, the display in the instrument console might be the primary display.

Control input to the vehicle computer can be provided using one of a number of approaches. Firstly, dedicated input buttons, dials, joystick or other controls may be provided (as illustrated by element 15 of FIG. 1). Also, one or more of the vehicle displays, such as the centre console display 13, may have a touchscreen input facility, thus enabling input by on-screen gesture, selection of buttons and/or use of a touch keyboard.

Thus there have now been described examples of an arrangement and structure by which a mobile device may be received into a vehicle. In the following discussion, further teachings will be provided in relation to replication of display regions from the mobile device to one or more displays of the vehicle.

Figure 3:
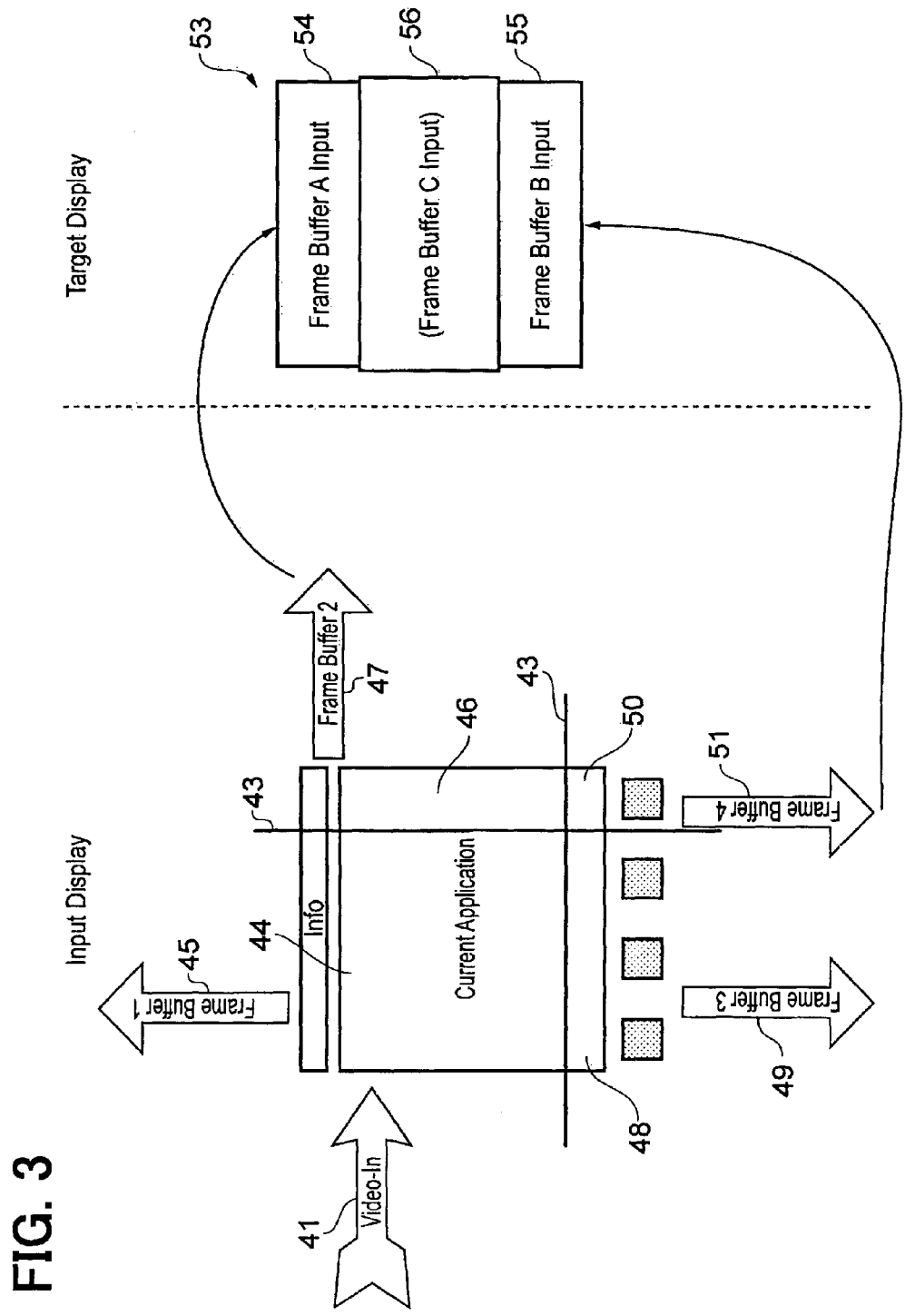
FIG. 3 shows schematically the division of a single display into regions.

FIG. 3 shows schematically the interaction between a user interface to divide a display and the display hardware to be used in displaying regions of a divided display.

In the present example, the display on which the user interface is provided is display of the vehicle driven by the vehicle computer, such that it is the vehicle computer that carries out the division processing and region forwarding to the selected displays. To achieve this, the display of the mobile device is duplicated to the vehicle using a suitable display duplication method. In the event of the mobile device being a small handheld device such as a smartphone or tablet computing device, the display duplication may utilise a technology for transmitting a sequence of screenshots from the mobile device to a connected device. Such technologies create and transmit frequent screenshots so as to be able to create the impression of a full video output transfer, but at a lower data rate than a full video output transfer would require. Examples of such technologies can include Terminal Mode and Virtual Network Client. In the event of the mobile device having a full video output capability (for example if the mobile device is a laptop computer), then the display duplication method may be to link the full video output capability of the laptop to a display input facility of the vehicle computer. Such duplication provides for full replication of the entire mobile device screen area to the vehicle.

In the present examples, as shown in FIG. 3, a video input 41 (for example from the mobile device) is received and which provides a full or partial screen duplicate of the display of the mobile device. In the event of a partial screen duplicate, then the vehicle computer can treat the partial duplicate the same as a full duplicate. The vehicle computer does not necessarily know or need to know how much of the mobile device display is duplicated. A selection can then be applied (as discussed in greater detail below) to divide the screen into multiple regions. In the example of FIG. 3, two division lines 43 are used, thus dividing the mobile device display as received via the video input into four regions 44, 46, 48 and 50. These different regions can then be separated by the vehicle computer four respective frame buffers 45, 47, 49, 51. Then for a target display 53, the output of each of the frame buffers used by the vehicle computer to divide the display can be used as the input for a frame buffer for a target display for the respective display region. In another example, the output frame buffer from the divided screen could be the same buffer as the input buffer for the target display.

As shown in FIG. 3, the output display buffer 47 from the vehicle computer for the second region 46 is in this example directed to the frame buffer 54 for target display section A and the output display buffer 51 from the vehicle computer for the fourth region 50 is in this example directed to the frame buffer 55 for target display section B. In this example, there is a third section 56 of the target display which is not available for mobile display device duplication. This may occur where a part of a vehicle display is reserved for a core vehicle display, such as an instrument panel display, or for a user selected priority display, such as a navigation display or a previously selected mobile device display region.

Thus an approach to manipulating display data into and between display buffers in order to facilitate display division of a duplicated display has now been described.

Figure 4A:
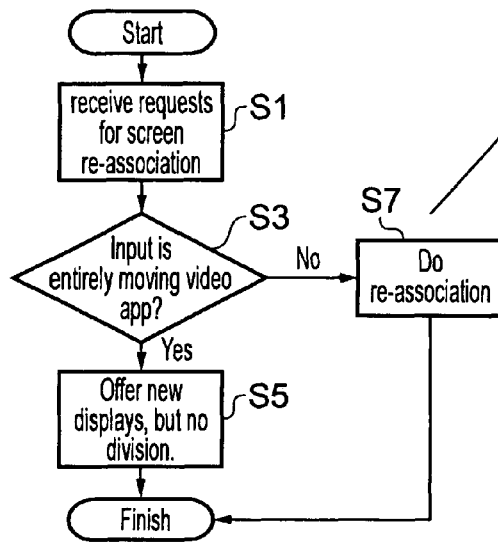
FIGS. 4A and 4B show a flow chart for a display region duplication method.
Figure 4B:
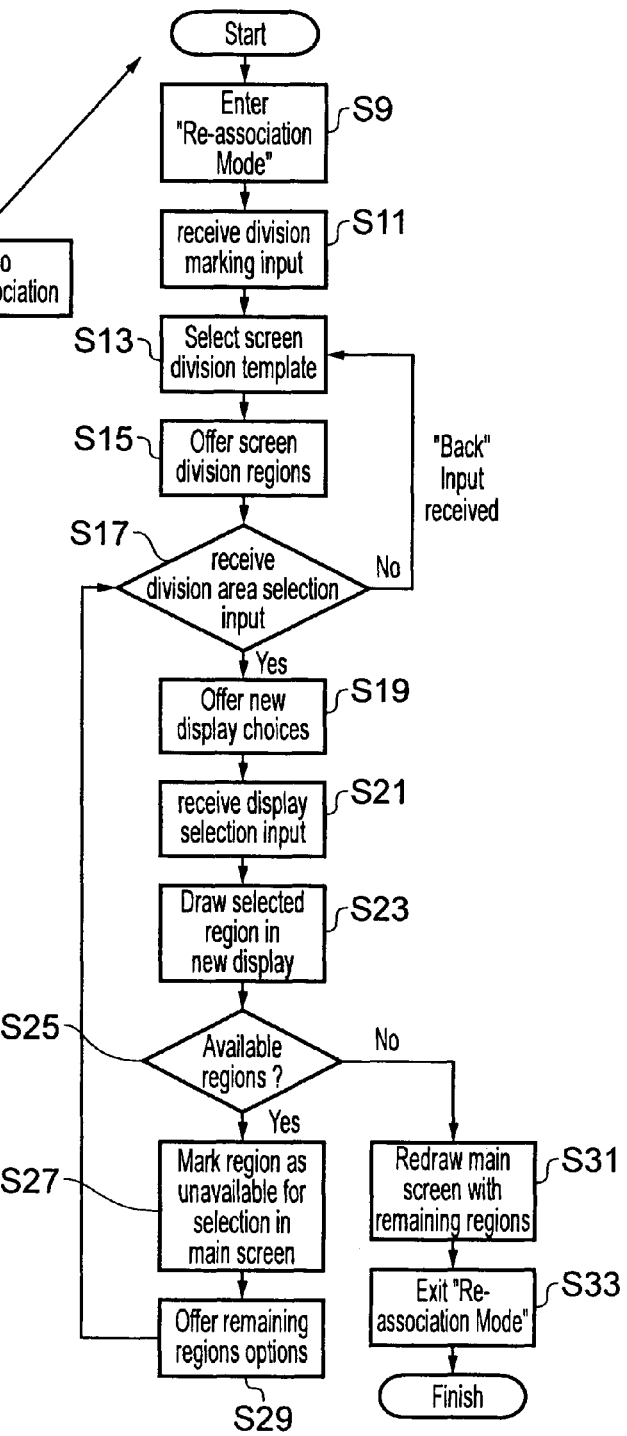

FIGS. 4A and 4B show flow-charts each illustrating a sequence of steps that can be performed by a vehicle computer to provide duplication of one or more mobile device display regions onto one or more displays of a vehicle, otherwise describes as screen re-association as the process re-creates, creates or modifies an association between the mobile device display and one or more displays of the vehicle. A pre-division check is illustrated in FIG. 4A and a main division process is illustrated at FIG. 4A. The pre-division check is used in the present to exclude the possibility of display division in the case where the mobile device display is playing full screen video content. Although it is expected that such an output may be required for display duplication, it is assumed in this example that it would not be desirable for the user to subdivide a video playback, such that full screen duplication would be the most appropriate duplication approach.

The steps in the pre-division check are thus, at S1, to receive a user input requesting screen re-association, and responsive thereto, at step S3, to check whether the mobile device screen output is presently entirely devoted to moving video. If the result of this check is positive, then processing continues at step S5 where the user is offered a choice of target displays within the vehicle, but subdivision is not offered. Once any screen selection process has completed, the method then ends. On the other hand, if at step S3 it is determined that the display of the mobile device is not entirely devoted to video, processing continues to step S7 where a full re-association process is initiated.

Referring now to FIG. 4B, the full re-association process commences at step S9 where the re-association mode is entered. When this mode is entered, the display from the mobile device is presented to a user on a display of the vehicle, typically the primary display, and the system is ready to receive an input from a user for a marking to indicate division of the display. Upon receipt of division marking input at step S11, the process continues to step S13 where a screen division template is selected. The selected template is then offered to a user at S15, whereupon an input is awaited. Once an input is received, at S17, if the input is a "back" input processing returns to S13 for another template to be selected.

If on the other hand, the input is a positive selection, then processing continues to step S19 for selection of a target display. A more detailed discussion of division marking input and template selection is provided below with reference to FIGS. 5 to 10.

At step S19, the available target display locations are offered and at step S21 a selection input is received. In response to the selection input, the selected region is displayed in the selected target display area at step S23. A more detailed discussion of division marking input and template selection is provided below with reference to FIGS. 11 and 12.

The method then continues with a check at S25 to determine whether any more mobile device display regions remain available. If the answer is yes, then at step S27 the most recently selected region is marked as unavailable for selection before processing continues to step S29 at which the remaining screen division options are offered for selection. Processing then returns to step S17 for handling of the selection input.

If on the other hand it is determined at step S25 that no more mobile device display regions remain available, then at step S31 the screen is redrawn showing the screen divisions and showing any remaining regions that are not allocated for redisplay on a target display. Regions could remain in this way if the screen division template included non-redisplayable regions or if all of the possible target displays are allocated out for redisplay of other regions before the number of regions is exhausted. At this point the process exits re-association mode at step S33.

Thus there has now been described a process by which the display of a mobile device can be divided into regions and one or more of those regions can be selected for display on a target display of a vehicle in which the mobile device is received.

Figure 5:
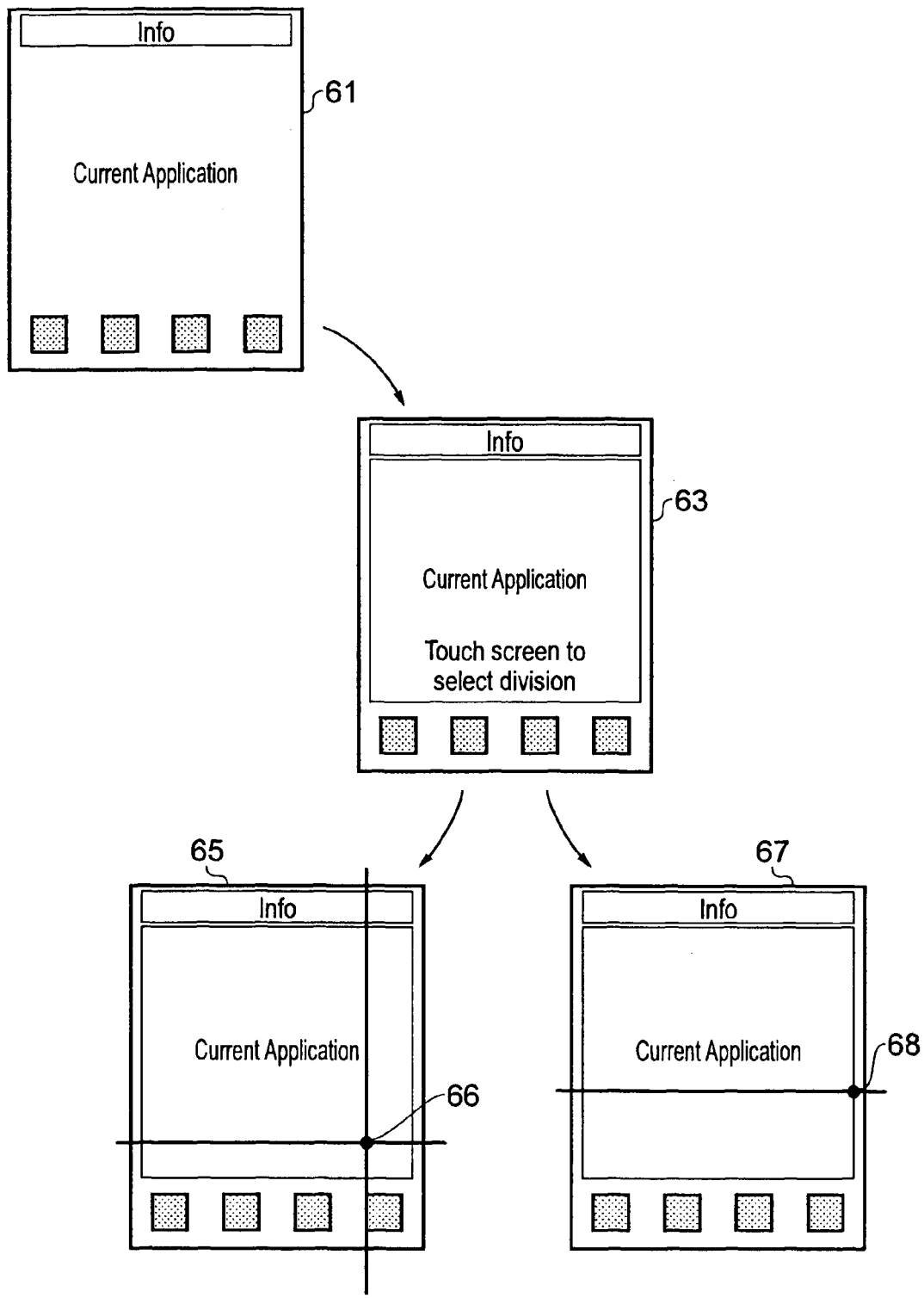
FIG. 5 shows a schematic representation of a user interface for receiving a region division input.

Referring now to FIG. 5, an example of the process for entering re-association mode and receiving input to define division markings is illustrated by way of example screenshots from the primary display of the vehicle computer user interface in which point input is used.

First, the interface prior to re-association mode 61 shows a direct duplication of the display of the mobile device. Once re-association mode is entered, the display 63 has an element requesting input to create a division. In the present example, the input cues, division illustrations and other interface elements are presented as overlay elements on the duplicate of the mobile device display. In other examples, alternative interface element types could be used, such as icons or other indicators adjacent the duplicate of the mobile device display and/or iconic or schematic representations of the mobile device display located over, near or instead of the duplicate of the mobile device display.

Division creation input may be provided using any of the input devices outlined above. For example, the input may be provided using some form of touch input (either direct touchscreen input or cursor control input from a touchscreen or separate touchpad), or by other control (such as joystick or haptic switch), or by voice control.

Two example point input selections are illustrated in FIG. 5. These screens illustrate the duplicated display of the mobile device with a division input interface overlay present.

Screen 65 shows a point input 66 that is not adjacent any boundary edge of the display. This point input therefore can be treated as the intersection of a pair of lines running parallel to the height and width of the screen, such that four regions can be defined thereby.

Screen 67 shows a point input 68 that is adjacent a boundary edge of the display. This point input therefore can be treated as a point on a line perpendicular to the edge to which it adjacent, such that the screen can be bisected into two regions thereby. If the input is adjacent a side boundary edge (as shown) then the bisection results in top and bottom regions. If the input is adjacent a top or bottom boundary edge, then the bisection results in left and right regions.

Figure 6:
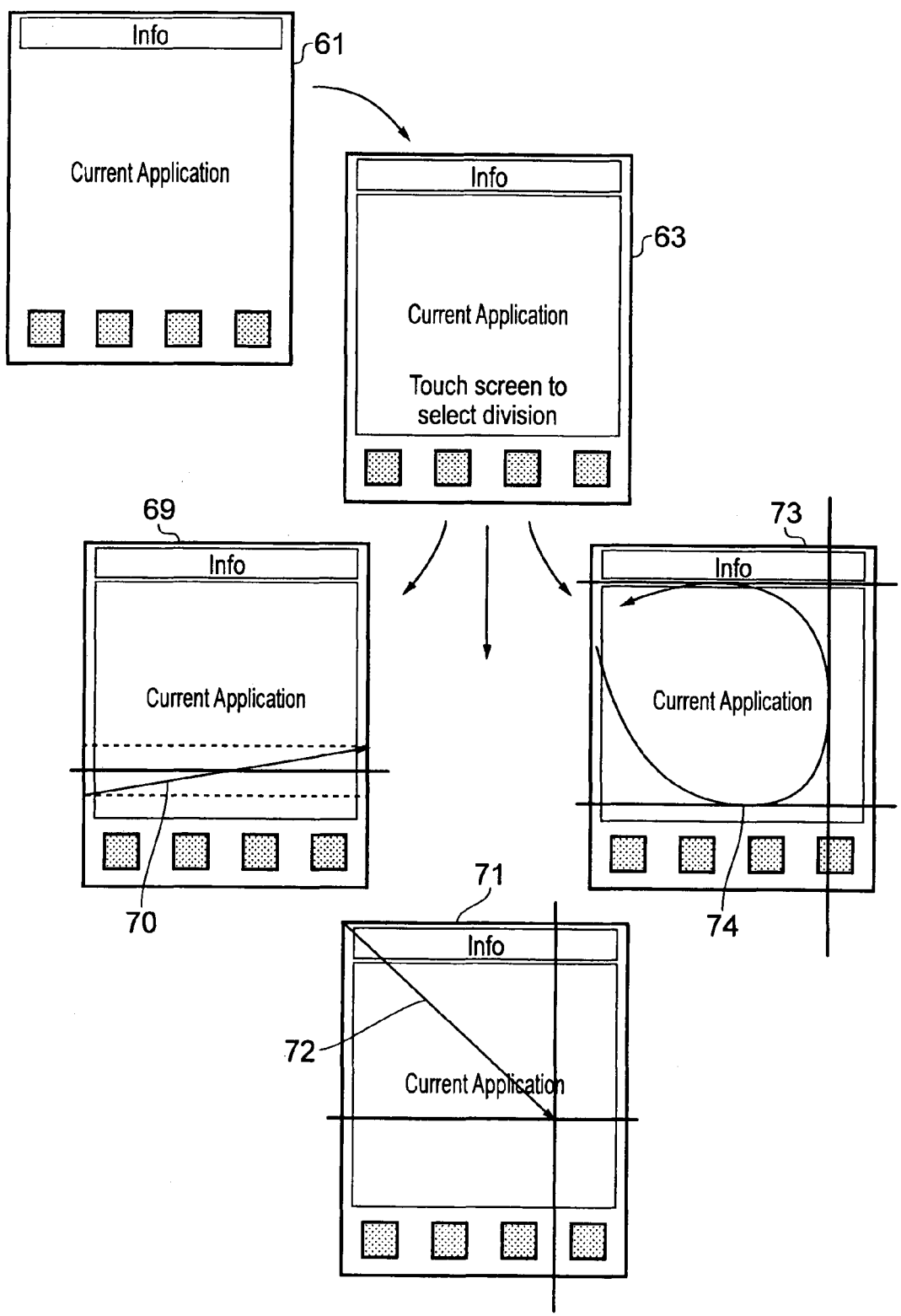
FIG. 6 shows a schematic representation of another user interface for receiving a region division input.

Referring now to FIG. 6, an example of the process for entering re-association mode and receiving input to define division markings is illustrated by way of example screenshots from the primary display of the vehicle computer user interface in which line input is used.

First, the interface prior to re-association mode 61 shows a direct duplication of the display of the mobile device. Once re-association mode is entered, the display 63 has an overlay element requesting input to create a division.

Division creation input may be provided using any of the input devices and approaches outlined above.

Three example line input selections are illustrated in FIG. 6. These screens illustrate the duplicated display of the mobile device with a division input interface overlay present.

Screen 69 shows a line input 70 that approximates a dividing line across the screen. Thus the input can be treated as a bisecting line to result in a two region division. As shown the dividing line approximates a horizontal dividing line, to result in top and bottom divisions. If the line were a better approximation to a vertical line than a horizontal line, then left and right regions could instead be defined. In the present example, the received user input is tracked to measure the minimum and maximum values in both x and y directions on the display. If the difference between maximum and minimum x is greater than the difference between maximum and minimum y, then the input is treated as a horizontal line along the x-direction to result in top and bottom regions. If, on the other hand, the difference between maximum and minimum y is greater than the difference between maximum and minimum x, then the input is treated as a vertical line along the y-direction to result in left and right regions. In the case of a horizontal line, the y-direction position which defines the relative size of the top and bottom regions can be defined based upon any of the y values of the input line. In the illustrated example, the y position is taken as the midpoint of the y values recorded from the line input. In other examples, the y position could be taken as the minimum y value of the line input, the maximum y value of the line input or any other position that can be defined by the value maximum and minimum. As will be appreciated, the equivalent approach can be taken with x direction values where the line is a vertical line.

Screen 71 shows a line input 72 that defines a diagonal dimension of a first screen region. This is therefore a very similar input to the point input 66 on screen 65 shown in FIG. 5. The system can interpret the line as having started in the display corner nearest to which the input actually started and as ending at the endpoint of the line and it is this endpoint that provides the intersection of horizontal and vertical dividing lines across the screen.

Screen 73 shows a curved input line 74 that approximates to a region boundary. This line therefore can be used to define the boundaries of one region, which boundaries can then be extended to divide the display. Thus, in the present example, the input line 74 defines a region that extends from the left hand edge some way across the screen and the extends along a part of the vertical height of the screen but does not contact either the top or bottom edges. The line positions can be identified by looking at maximum and minimum x and y values of the input line and placing a dividing line corresponding to each of those maxima and minima. This example input provides for two horizontal and one vertical dividing lines to provide six regions. In another example, this input could be interpreted as starting in the corner closest to where input commenced so as to result in only one horizontal and one vertical lines, thus giving rise to four regions.

Further examples of both point and line input that give rise to multiple horizontal and/or vertical lines are shown in FIGS. 7A to 7F. These screens illustrate the duplicated display of the mobile device with a division input interface overlay present.

Figure 7A:
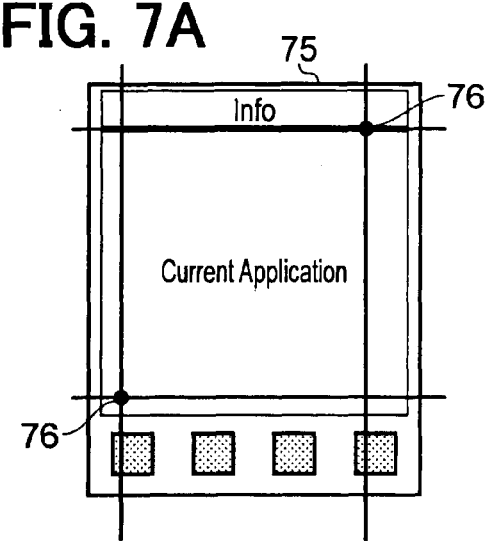
FIGS. 7A, 7B, 7C, 7D, 7E, 7F show schematic representations of further examples of a user interface for receiving a region division input.

In FIG. 7A, screen 75 illustrates a situation where two point inputs 76 are provided, each of which defines an intersection of desired region boundary lines across the screen. This, in this example the two points can define nine regions of the display.

Figure 7B:
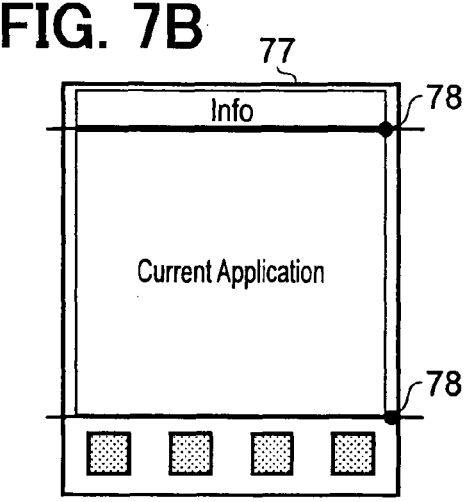

In FIG. 7B, screen 77 illustrates a situation where two point inputs 78 are provided adjacent respective boundaries of the display such that in this example two horizontal lines are defined to result in three display regions.

Figure 7C:
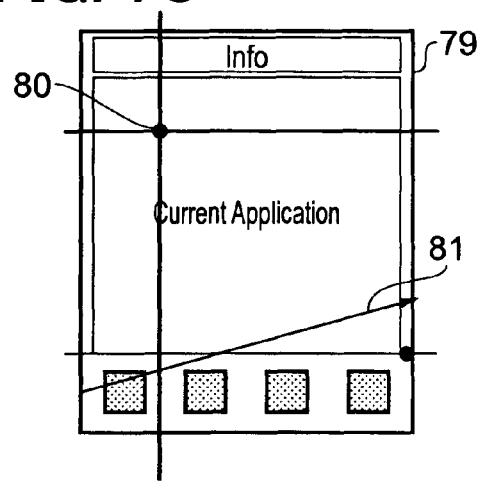

In FIG. 7C, screen 79 illustrates a situation in which one point input 80 and one line input 81 are provided. The point input 80 defines a line intersection giving rise to one vertical and one horizontal line and the line input 81 defines one horizontal line, such that 6 regions are created.

Figure 7D:
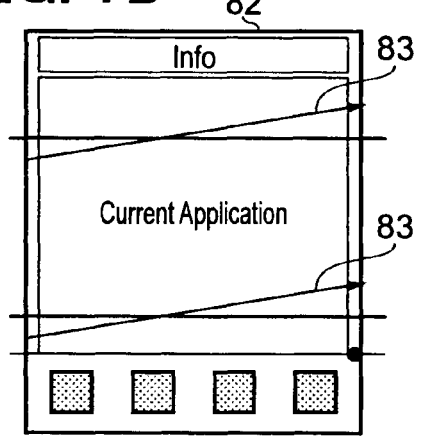

In FIG. 7D, screen 82 illustrates a situation in which two line inputs 83 are provided. In this example, both line inputs are horizontal, such that three regions are defined.

Figure 7E:
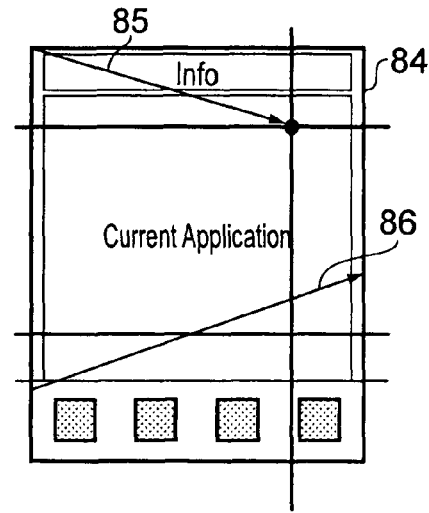

In FIG. 7E, screen 84 illustrates a situation in which two differing line inputs are provided. A line 85 similar to that illustrated in screen 71 of FIG. 6 defines a region diagonal reaching a line intersection point and a horizontal line 86 defines a single horizontal line. Thus six regions are defined in this example.

Figure 7F:
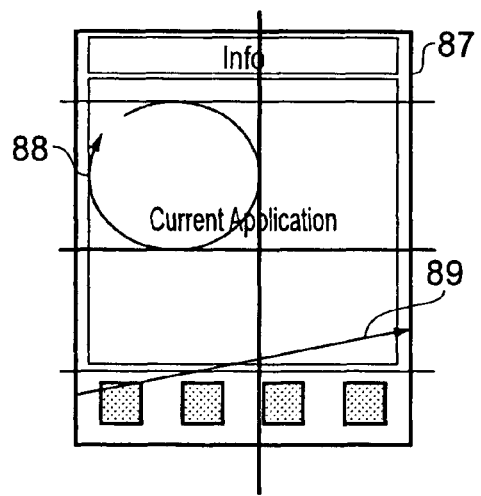

In FIG. 7F, screen 87 illustrates a situation on which one curved line input 88 and one straight line input 89 are provided. The curved line input defines three lines and the straight line input defines one line, so as to provide 8 regions.

Thus there have been described a variety of example point and line inputs where an input can be received to define an intended region boundary line or lines for display division. As will be appreciated, different implementations may provide for one or more of these example input approaches to be used together or in differing input modes of a single vehicle computer system. In addition, different implementations may provide for one, two or more parallel region boundary lines to be accepted for region definition. In some examples, the number of available boundary lines may be dependent upon the physical or pixel number size of the display of the mobile device. For example a tablet computing device display may be permitted more lines than a smartphone display.

In addition, although all of the above examples define the boundary division lines as being either horizontally or vertically aligned on the display of the mobile device, the region boundary lines can run at an angle across the display or be curved. With reference to FIG. 3 above, it will be understood that the region definition lines set out the pixel patterns for which elements of the source display will be forwarded to which target display buffer.

Figure 8A:
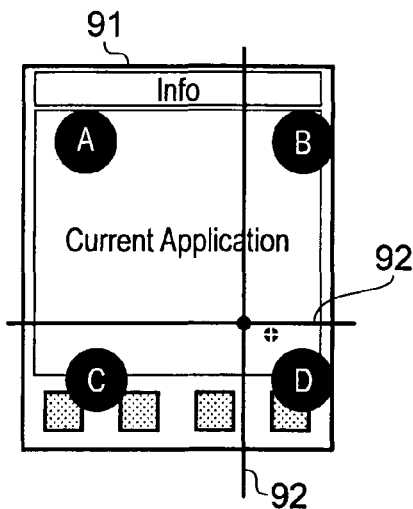
FIGS. 8A and 8B show a schematic representation of a region division input giving rise to a template comparison.

Moving on to consider selecting a screen division template based upon the division inputs, FIG. 8A illustrates a screen 91 overlaid with two division lines 92 determined from an input to define boundary positions. Thus the display 91 of the present example has four regions, A, B, C and D. In this example, the dimensions of the different regions are as follows: A=8×8 units, B=2×8 units, C=8×4 units, D=2×4 units. In addition, the possibility of merged regions can also be considered, giving options of A+B=10×8 units, A+C=8×12 units, B+D=2×12 units, C+D=10×4 units. This region-divided display can then be compared to a plurality of display templates 93 in FIG. 8B to find one or more candidate templates that most closely match the divisions created by the received input. The plurality of templates can be a predetermined set of templates that encompass all available screen divisions for any connectable device. Alternatively, a subset of templates can be made available based upon, for example, a determination of the type of the received mobile device, or a user selection of a template category to make available.

Figure 9:
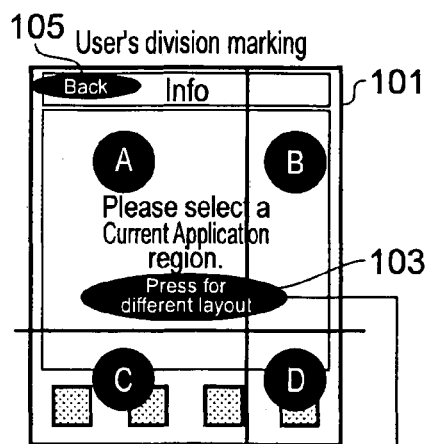
FIG. 9 shows a schematic representation of template comparison.
Figure 9:
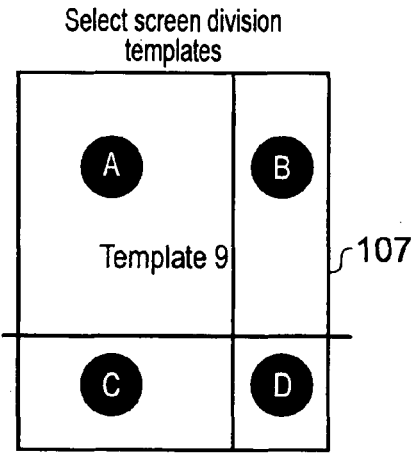
Figure 9:
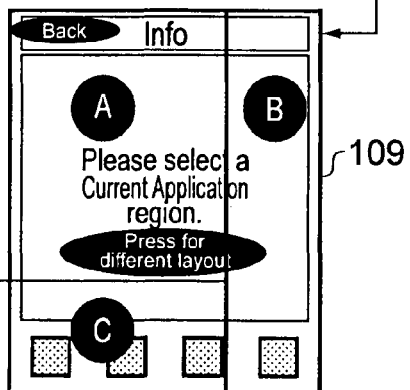
Figure 9:
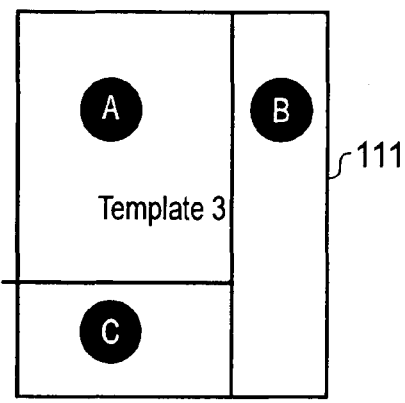

A selection process for offering and receiving input to select a template is further illustrated with respect to FIG. 9.

Figure 8B:
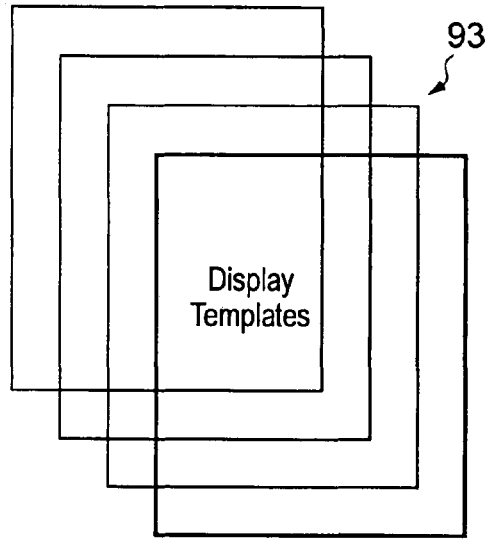

In the present example, following a comparison between the screen 91 of FIG. 8A and the plurality of templates 93 in FIG. 8B, the first candidate template is displayed overlaid on the duplicated mobile device display. This candidate template shows the actual regions that use of this candidate template would create and provides options to view a further candidate template by way of interface button 103 and to restart the region definition process by way of interface button 105. As illustrated in FIG. 9, the template selected as the first candidate template in this example is template 9, shown at 107 and having four regions A, B, C and D that correspond respectively to the regions A, B, C and D defined through division selection input to screen 91 of FIG. 8A. It will be understood that the divisions of the template may not correspond exactly to the division lines created by the division selection input as the template has fixed division positions and is identified by a comparison based around most similar line positions.

If input is received corresponding to the interface button 103 for viewing a further candidate, then the duplicate mobile device display is overlaid with the next candidate template, as shown at 109. In this example, the second candidate template is template 3, shown at 111. This template has three regions: A, B and C, which correspond respectively to the regions A, B+D and C defined through division selection input to screen 91 of FIG. 8A.

Once a user selects one of the candidate templates, the screen division process is complete and distribution of the regions created by the division can be carried out.

Figure 10:
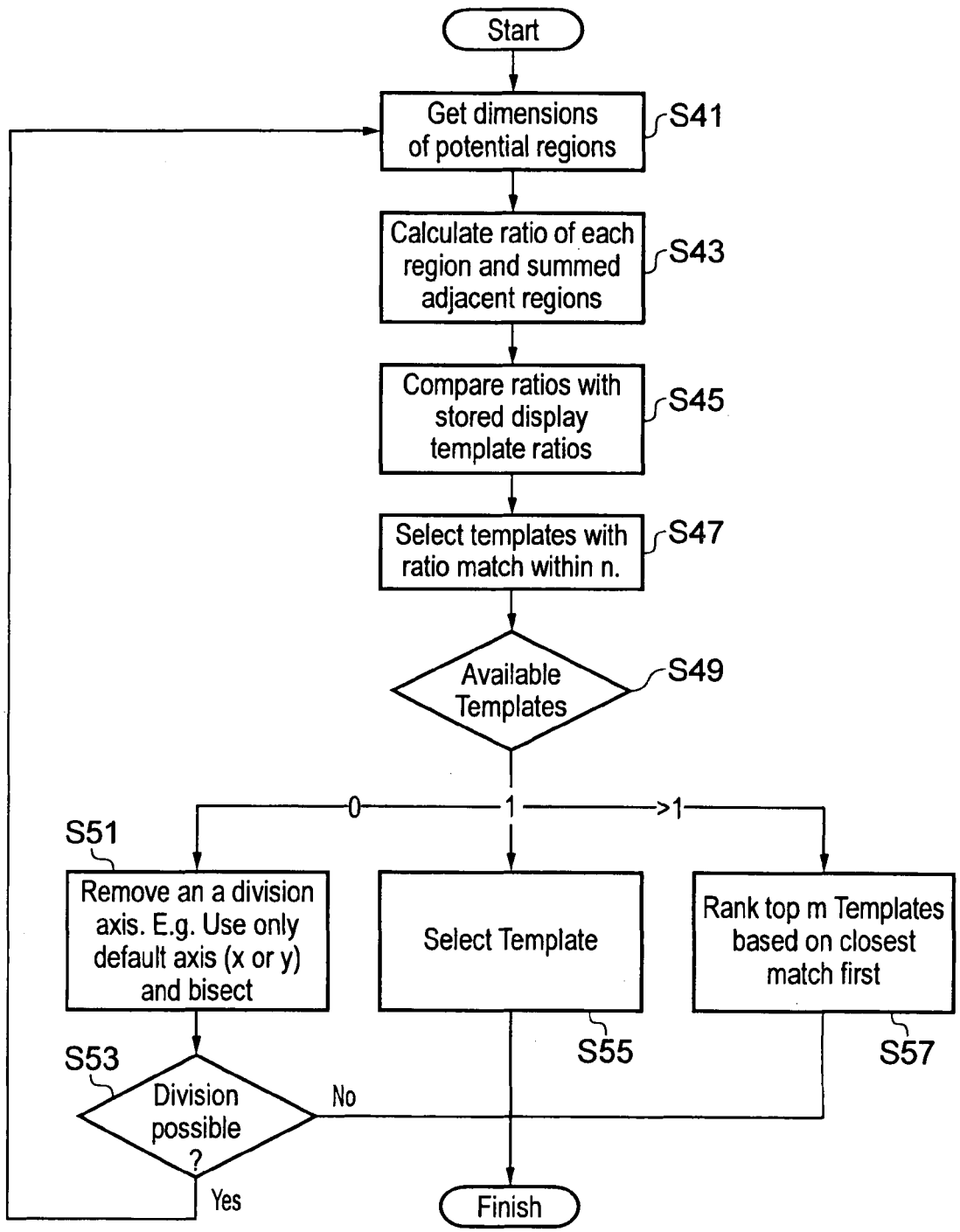
FIG. 10 shows a flow chart for a template comparison.

FIG. 10 shows a flow chart illustrating method steps corresponding to the teachings provided above with reference to FIGS. 5 to 9.

In the example method of FIG. 10, the process for locating and selecting a template starts at step S41 where the process receives dimensions of potential regions. This receiving of dimensions can be carried out by inviting a user input for any form of screen division definition input. Examples of suitable input types that can be invited and received are discussed above and further examples are shown in FIGS. 5, 6, 7A, 7B, 7C, 7D, 7E, and 7F.

Once the dimensions are received, the process then calculates the ratio of each region defined by those dimensions in step S43. In addition, S43 can also calculate the ratios for summed adjacent regions. An example of the output of this step is given above in the discussion of FIGS. 8A and 8B.

Based upon the calculated region ratios, the values can be compared to the stored values for a set of templates at step S45. As discussed above, this comparison enables a template that approximates to the set of ratios to be selected. Depending upon the ratios of the received region dimensions and the ratios of the stored templates, more than one template may be selected as candidate templates at step S47.

Then at step S49, a check is performed to determine how many putative match templates have been returned. If no candidate templates are returned, then at step S51 one of the division axes created by the received dimensions is removed in an attempt to increase the number of candidate templates. In the present example, a default instruction exists to remove the uppermost X-direction division axis first. In other examples, and other possible division axis can be selected as the default for first (or subsequent) axis removal attempts. In other examples, multiple removal attempts may be performed in parallel or in sequence to generate a larger candidate template list before presenting that larger list of candidate templates for a selection input. In other examples, a user may be provided with the option of selecting which axis to remove first.

Then, once an axis has been removed from the divisions defined by the received dimensions, a test is performed at step S53 to determine whether division is possible by checking whether removal of the axis leaves regions without defined boundaries. If no division is determined to be possible, then the process ends. If division is determined to be possible, then the process returns to step S41, using the revised dimensions from step S51 as the input dimensions.

If, on the other hand, it is determined at step S49 that a single candidate template has been returned, then that template is selected as the matching template at step S45 before the process finishes.

If it is determined at step S49 that more than one candidate templates have been returned, then these can be ranked according to the closeness of match at step S57. As discussed above with reference to FIG. 9, the multiple different templates can be offered to a user for a user selection. Such an offer can be made as part of the presently described process, or may be a further process carried out after completion of the presently described process.

Thus, examples have now been described showing how a computer system can invite and receive input relating to screen division for a duplicated display and can then compare that input to predefined templates to enable one or more available templates to be offered to a user for use in the screen division.

In addition to or instead of the manual point and/or line division inputs followed by template selection discussed above, it is also possible to provide for screen division in other ways. One example is where the system provides for the user to choose a line direction, then provides a line in the chosen direction and then provides for the user to move the line to a chosen position. This can then either be used as the template, or a template matching process can be conducted. Another example is where the system provides a series of template overlays and enables a user to view the templates in position over the mobile device display and to select a chosen template for use.

Figure 11:
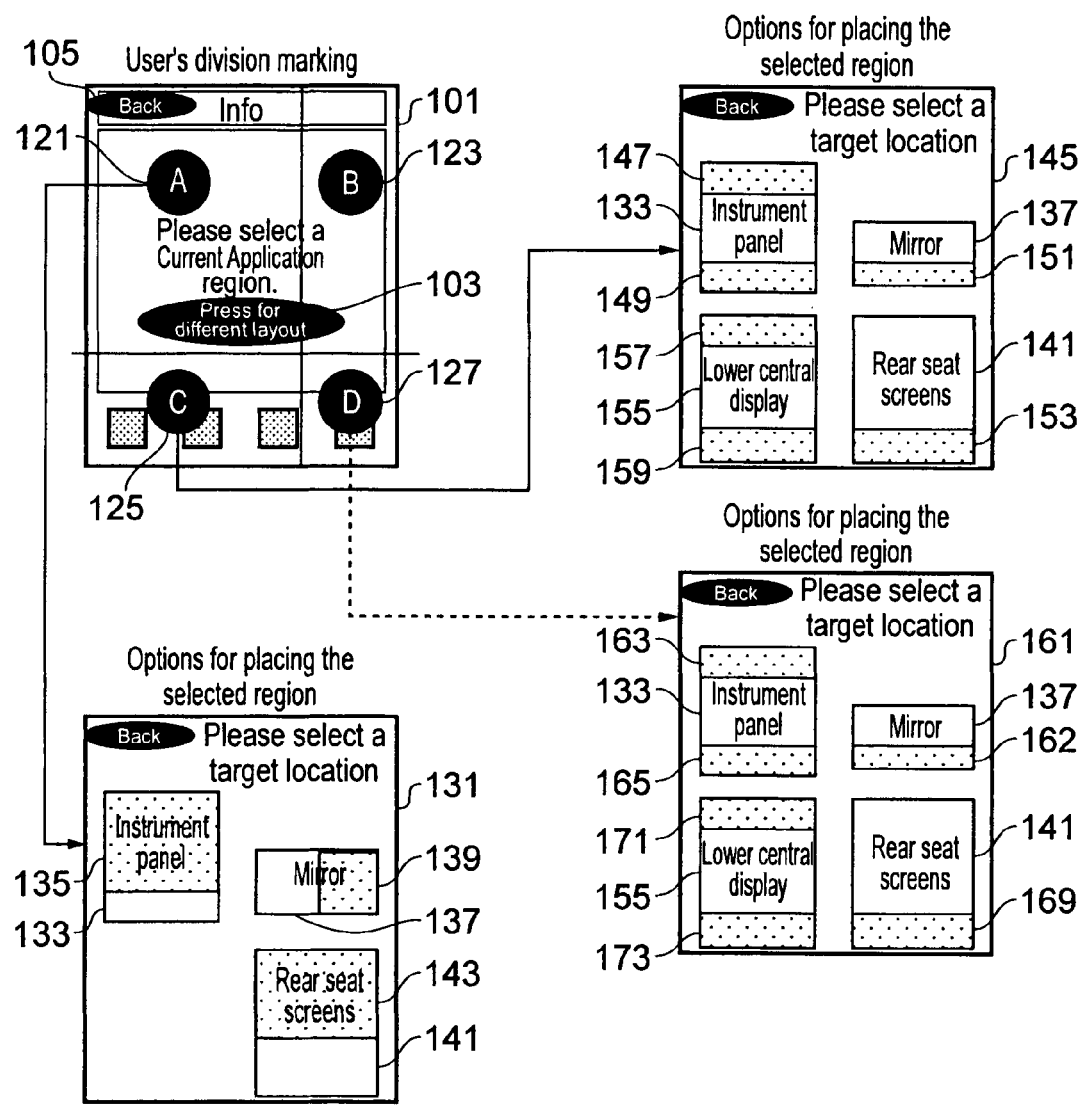
FIG. 11 shows a schematic representation of a user interface for target display selection for a first region.
Figure 12:
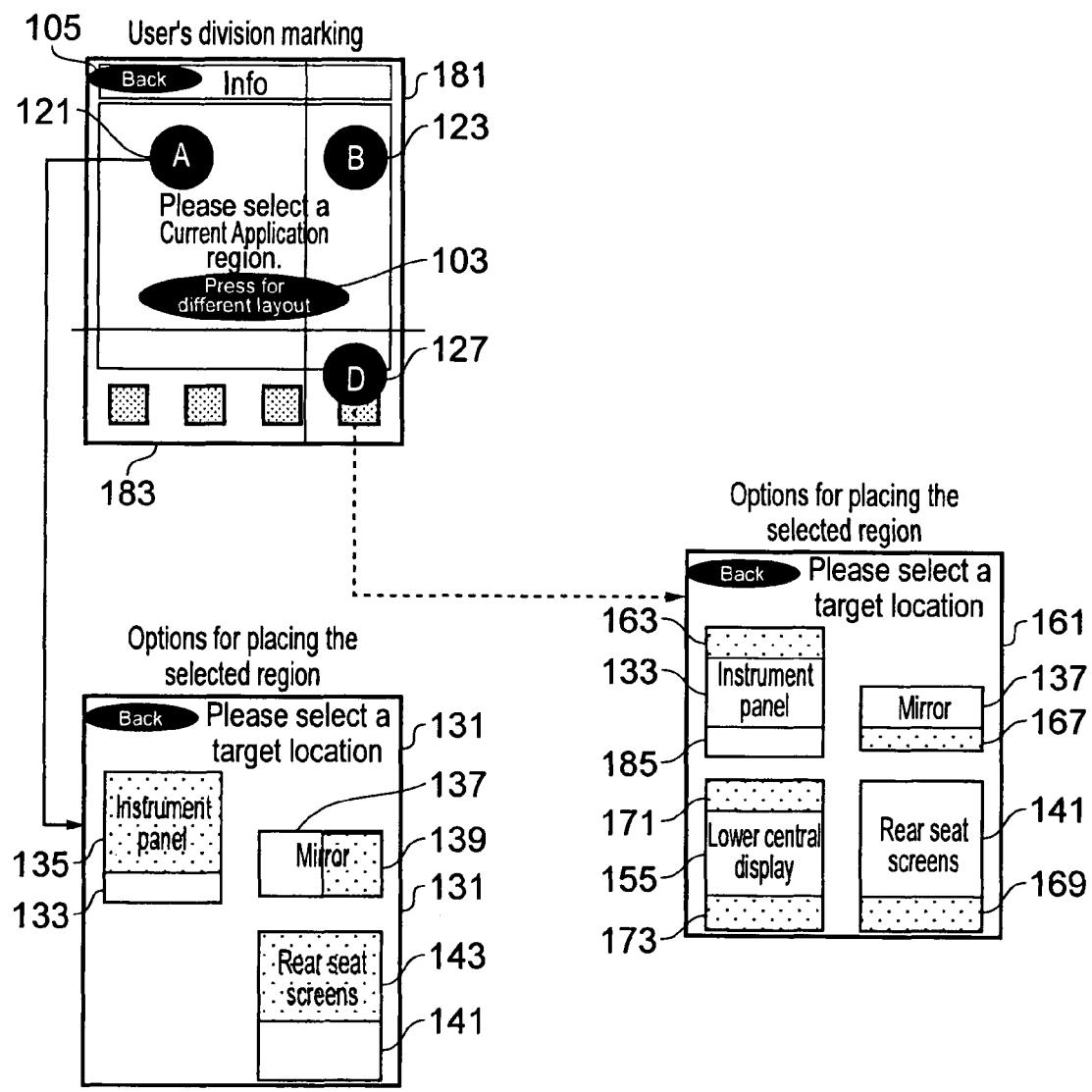
FIG. 12 shows a schematic representation of a user interface for target display selection for a second region.

Now, with reference to FIGS. 11 and 12, description will be provided in relation to distribution of one or more regions of a divided duplicated display onto one or more target screens of a vehicle into which the device which is the source of the duplicated display is received.

FIG. 11 shows the screen 101, previously discussed with reference to FIG. 9 above and which shows a presently selected candidate template. In addition to the options to view a further candidate template by way of interface button 103 and to restart the region definition process by way of interface button 105 (both discussed above), the screen 101 also has region selection buttons to enable a user to select the regions of the template for display. In the present example where four regions A, B, C, D are defined in the template, there are four region selection buttons, one each for regions A (121), B (123), C (125) and D (127).

Selection of one of these region selection buttons by a user causes a target display selection screen to be displayed. Starting with the example of an input to select region A by using button 121, the next displayed screen is screen 131, which presents the options for the target display within the vehicle for the selected region A. The available target displays are based upon a combination of the screen availabilities within the vehicle and the dimensions and aspect ratio of the selected region. In the present example, the available displays for region A are the instrument panel 133, a mirror 137 and the rear seat screens 141. As the aspect ratio does not necessarily match that of the whole of each of those screens, or because a part of those screens may be reserved for vehicle systems display, the display region on offer in each case is less than the whole area of the vehicle display in question. Thus within the instrument panel 133 the available display is the area 135, within the mirror 137 the available display area is the area 139 and within the rear seat screens 143 the available display area is the area 143.

If it is considered that the present example in fact proceeded by receiving input at screen 101 to select region C, by use of button 125, then the screen 145 would be displayed. The target display options in this case are for either of regions 147 or 149 of the instrument panel 133, region 151 of the mirror 137, region 153 of the rear seat screens 141, and regions 157 or 159 of a lower central display 155.

If it is considered that the present example in fact proceeded by receiving input at screen 101 to select region D, by use of button 127, then the screen 161 would be displayed. The target display options in this case are for either of regions 163 or 165 of the instrument panel 133, region 167 of the mirror 137, region 169 of the rear seat screens 141, and regions 171 or 173 of lower central display 155.

Thus it can be seen that once a user provides input to select a region of a duplicated display for distribution to a target display of a vehicle into which the device which is the source of the duplicated display is received, the system can provide for further input to be provided to select which of a number of possible target displays the region should be displayed upon. Where the region would take up or be permitted to take up less than all of a given target display, the system can indicate the given area or areas within a given target display that are available and provide for selection input to be provide therefor.

FIG. 12 shows a revised screen 181, that is very similar to screen 101 previously discussed above. The difference between screens 101 and 181 is that in screen 181 a region that has already been selected for display within the vehicle is now unavailable. For the purposes of the present example, it is considered that the region C is previously selected for display, such that there is no button 125 and instead the region C is marked as unavailable 183. It is also considered in this example that the selected target display location for region C is the lower region of the instrument panel (area 165 of FIG. 11).

Selection of one of the remaining region selection buttons 121, 123, 127 by a user causes a target display selection screen for the selected region to be displayed. Starting with the example of an input to select region A by using button 121, the next displayed screen is screen 131 which, because none of the target display areas on offer for this region overlaps with or conflicts with the area previously selected for display of region C, is in the present example identical to the screen 131 described with reference to FIG. 11 above.

If it is considered that the present example in fact proceeded by receiving input at screen 181 to select region D, by use of button 127, then the screen 161 would be displayed. This is identical to the screen 161 described above with reference to FIG. 11 except that, as the previous selections for the display of region C used the target display area 165, instead of area 165 being available for selection, this area is unavailable, as shown at 185.

Thus it can be seen that once a user provides input to select a region of a duplicated display for distribution to a target display of a vehicle into which the device which is the source of the duplicated display is received, the system can provide for further input to be provided to select a further region of the supplicated display which further region can be offered for display to any possible target display not already used by a previously selected region.

There have therefore been described a number of example approaches for implementing a system that enables a duplicated display from a mobile device received in a vehicle to be divided into regions and for one or more of those regions to be reproduced on one or more display areas of available displays in the vehicle.

As discussed above, the system that provides capability for display division can be implemented within a computer system of a vehicle. The computer system can be capable of receiving (establishing a data connection with) a mobile device and receiving a display duplication stream therefrom. The computer system can also be capable of accepting an input to indicate a screen division and of providing a proposed division structure based upon that input. The computer system can also be capable of receiving an input to select a screen division region and to select a display area within the vehicle for the selected region. The computer system can also be capable of directing the selected display region to the selected display area. Such inputs can be received via a touch interface such as a keyboard, touchpad, cursor controller, joystick, switches, touchscreen etc or via a voice interface such as a microphone and speech recognition engine.

Although it has been described above that the display is duplicated in whole to the vehicle, and the vehicle then provides the user interface for region selection and performs the display division, in another example the display may be divided on the mobile device and then the selected regions may be transmitted to the vehicle computer for display on one or more vehicle displays. Such an implementation may require a greater degree of communication between the vehicle and the mobile device as the mobile device would need to be provided with details of the available vehicle displays and an identification of the target display for each display region stream would need to be provided to the vehicle computer. However, such an approach might be expected to reduce the templating effort required as the device would only need to know templates applicable to that device rather than knowing templates required for all possible devices. In this arrangement, the software to control the region selection user interface could be made available by a vehicle supplier, for example by way of a so-called "app".

Also, although it has been described above that display regions can be duplicated to various vehicle target displays at the discretion of a user, it is possible for the vehicle computer or other processing resource in the vehicle to restrict display duplication to one or more target displays in dependence upon a vehicle condition. Such vehicle conditions can include a driving condition such as moving, moving above a threshold speed, moving below a threshold speed, stopping, and stopping with the parking brake applied. In some implementations, a particular duplicate display region can be made available on or removed from one or more target displays of the vehicle. For example, duplicate content such as Internet news or a video from a mobile device can be displayed on target displays of the vehicle screen that are located such that the driver's attention is not distracted thereby while the vehicle is in motion. Example locations can include screens mounted for rear seat viewing and/or for passenger seat viewing. While the vehicle is in motion, the display on all target displays visible to the driver can include other content, either other duplicate content of a non-distracting nature or vehicle content such as speed, fuel, temperature etc. When the vehicle is not in motion, or when the vehicle is judged to be parked (for example by selection of a "park" gear and/or application of the parking brake), the content distracting content can additionally be displayed on one or more target screens visible to the driver, in accordance with an original target display selection made as part of a re-associate process as outlined above.

While various examples and embodiments have been described of dividing a duplicated display from a mobile device received in a vehicle into multiple display regions and then causing one or more such regions to be displayed at a chose target display area of the vehicle, it should be understood that they have been presented by way of example only and not limitation. It will be understood by those skilled in the art that various changes in form and details may be made therein without departing from the spirit and scope of the disclosure. Thus, the breadth and scope of the present disclosure should not be limited by any of the above-described examples, but should be defined only in accordance with the following claims and their equivalents.

The invention claimed is:

1. A method of replicating a display output of a mobile device onto a display of a vehicle, the method comprising:
    receiving the display output from the mobile device to display as a single screen duplicate in the vehicle;
    activating a region selection interface configured to receive at least one input defining a plurality of selected interface regions of the single screen duplicate, the single screen duplicate of the received display output of the mobile device is divided into the plurality of selected interface regions;
    activating a target selection interface configured to receive an input defining a target display location within the vehicle; and
    outputting at least one of the plurality of selected interface regions to the vehicle for display on the target display location;
    wherein the activating a region selection interface causes displaying of either an interface that invites an input to select a template for division of the single screen duplicate into the plurality of selected interface regions or an interface that invites an input to divide the single screen duplicate into the plurality of selected interface regions,
    wherein the target display location includes two or more selected from the group comprising: an instrument panel, a mirror, a console display, a head-up display, and a rear seat screen.

2. The method of claim 1, further comprising receiving the mobile device into the vehicle.

3. The method of claim 2, wherein the receiving comprises establishing a data connection between the mobile device and the vehicle.

4. The method of claim 3, wherein the data connection comprises one or more selected from the group comprising a wired data connection and a wireless data connection.

5. The method of claim 1, wherein at least one of the activating steps is carried out by a processor of the vehicle.

6. The method of claim 1, further comprising establishing a display duplication process from the mobile device to a processor of the vehicle.

7. The method of claim 1, further comprising, responsive to receiving an input selecting a template, comparing the received input to a plurality of available templates and determining a most likely intended template.

8. The method of claim 1, wherein the activating a region selection interface further comprises causing an interface to invite an input to select one of the regions of the selected template.

9. The method of claim 1, wherein the activating a region selection interface further comprises calculating, based upon receipt of an input to divide the display output into regions, a set of available regions of the display output.

10. The method of claim 9, wherein the calculating comprises comparing the received input to a present display division of the display output and determining a most likely intended division.

11. The method of claim 9, wherein the activating a region selection interface further comprises requesting an input to select one of the available regions of the plurality of selected interface regions.

12. The method of claim 1, wherein the activating a target selection interface comprises causing an interface to invite an input to select an available target display location within the vehicle.

13. The method of claim 12, wherein the available target display locations are dependent upon the plurality of selected interface regions.

14. The method claim 1, further comprising:
  detecting a vehicle condition; and
  selectively suspending the display of the selected interface region on the target display location in dependence upon the detected vehicle condition.

15. The method of claim 1, wherein the mobile device includes one or more selected from the group comprising: a mobile telephone, a smartphone, a personal digital assistant, a portable navigation device, and a tablet computing device.

16. A display duplication apparatus for a vehicle, the apparatus comprising:
  an input connected to receive a display signal from a mobile device, the display signal including a display output of the mobile device to display as a single screen duplicate in the vehicle; and
  a first display configured to display an invitation for input to define a plurality of selected interface regions of the single screen duplicate, the single screen duplicate of the display output of the mobile device is divided into the plurality of selected interface regions;
  wherein the first display is further configured to display an invitation for input to define a target display location of the vehicle; and
  a plurality of displays configured to display at least one the plurality of selected interface regions at the defined target display location of the vehicle
  wherein the invitation for input to define a plurality of selected interface regions of the single screen duplicate is either an interface that invites an input to select a template for division of the single screen duplicate into the plurality of selected interface regions or an interface that invites an input to divide the single screen duplicate into the plurality of selected interface regions,
  wherein the plurality of displays comprises two or more selected from the group comprising: an instrument panel, a mirror, a console display, a head-up display, and a rear seat screen.

17. The apparatus of claim 16, wherein the plurality of displays includes the first display.

18. The apparatus of claim 16, wherein the input is configured to receive the mobile device into the vehicle.

19. The apparatus of claim 18, wherein the input is configured to establish a data connection between the mobile device and the vehicle.

20. The apparatus of claim 16, wherein the input is configured to receive a display signal via one or more selected from the group comprising a wired data connection and a wireless data connection.

21. The apparatus of claim 16, further comprising a processor configured to cause a selected region to be displayed on one or more of the plurality of displays.

22. The apparatus of claim 21, wherein the processor is further configured to receive the display signal from the input, and to cause the selected region to be displayed on the one or more of the plurality of displays responsive to input received via a user input device.

23. The apparatus of claim 16, wherein the interface is configured to receive the display signal in the form of a display duplication stream from the mobile device to a processor of the vehicle.

24. The apparatus of claim 16, further configured to, responsive to the apparatus receiving an input selecting a template, compare the received input to a plurality of available templates and determining a most likely intended template.

25. The apparatus of claim 16, wherein the first display is further configured to display an invitation for input to define a selected interface region from the display output of the mobile device by displaying an interface to invite an input to select one of the regions of the selected template.

26. The apparatus of claim 16, further configured to, based upon receipt of an input to divide the display into regions, calculate a set of available regions of the display.

27. The apparatus of claim 26, wherein the calculating comprises comparing the received input to a present display division of the mobile device display and determining a most likely intended division.

28. The apparatus of claim 26, wherein the first display is further configured to display an invitation for input to define a selected interface region from a display output of the mobile device by displaying an interface to request an input to select one of the available regions of the plurality of selected interface regions.

29. The apparatus of claim 16, wherein the first display is further configured to display an invitation for to input define a target display location of the vehicle by displaying an interface to request an input to select an available target display location within the vehicle.

30. The apparatus of claim 29, wherein the available target display locations are dependent upon the plurality of selected interface regions.

31. The apparatus of claim 16, further comprising a condition dependent control configured to selectively suspend display of a selected interface region at a defined target display location of the vehicle in dependence upon a vehicle condition.

32. The apparatus of claim 16, wherein the mobile device includes one or more selected from the group comprising: a mobile telephone, a smartphone, a personal digital assistant, a portable navigation device, and a tablet computing device.

33. A vehicle comprising:
  a device interface configured to provide a data connection to a mobile device received in the vehicle;
  a head unit configured to communicate with a received mobile device via the device interface and to establish a display duplication data stream from the mobile device to the head unit to display as a single screen duplicate in the vehicle;

a plurality of displays, each connected to receive a data input from the head unit for display on the display; and an input device connected to the head unit and configured to transmit an input received thereby to the head unit; wherein:

the head unit is further configured to cause one of the displays to display a user interface section inviting input via the input device to define a plurality of selected interface regions of the single screen duplicate, the single screen duplicate of a display output of the received mobile device is divided into the plurality of selected interface regions, the display output being received as the single screen duplicate from the received mobile device;

the head unit is further configured to cause one of the displays to display a user interface section inviting input via the input device to define a target display location on two of the plurality of displays; and the head unit is further configured to forward data relating to the plurality of selected interface regions to the display that includes the target display location wherein the user interface section is either an interface that invites an input to select a template for division of the single screen duplicate into the plurality of selected interface regions or an interface that invites an input to divide the single screen duplicate into the plurality of selected interface regions, wherein the two of the plurality of displays comprises: an instrument panel, a mirror, a console display, a head-up display, and a rear seat screen.

34. A computer for a vehicle, the computer comprising:

a mobile device data connection input configured to communicate with a connected mobile device;

a display output configured to output display buffer content;

an input device connection configured to receive input signals;

wherein the computer is configured to:

receive a mobile device display data stream representing a display output of the mobile device via the mobile device connection input to display as a single screen duplicate in the vehicle;

output, via the display output, data describing a user interface element to request display division input;

receive a display division input via the input device connection, the display division input defines a plurality of selected interface regions of the single screen duplicate of the display output of the mobile device;

determine a display division based upon the received display division input by dividing the single screen duplicate of the display output from the received mobile device display data stream into the plurality of selected interface regions;

output via the display output data describing a user interface element to request target display input;

receive a target display input via the input device connection;

output at least one of the plurality of selected interface regions of the single screen duplicate of the display output of the received mobile device to a target display via the display output wherein the user interface element to request display division input is either a user interface element that invites an input to select a template for division of the single screen duplicate into the plurality of selected interface regions or a user interface element that invites an input to divide the single screen duplicate into the plurality of selected interface regions, wherein the target display includes two or more selected from the group comprising: an instrument panel, a mirror, a console display, a head-up display, and a rear seat screen.

* * * * *